United States Patent [19]
Heil et al.

[11] Patent Number: 4,990,214
[45] Date of Patent: Feb. 5, 1991

[54] MASKING DEVICE WITH TAPE TRACKING MEMBER

[75] Inventors: Robert H. Heil, New Richmond, Wis.; Frederic A. Longworth, Shoreview; Allen J. Rivard, White Bear Lake, both of Minn.

[73] Assignee: Minnesota Mining and Manufacturing Company, Saint Paul, Minn.

[21] Appl. No.: 491,281

[22] Filed: Mar. 9, 1990

Related U.S. Application Data

[63] Continuation-in-part of Ser. No. 326,015, Mar. 20, 1989, Pat. No. 4,915,769.

[51] Int. Cl.[5] .......... B32B 35/00; B32B 31/08
[52] U.S. Cl. .......... 156/527; 156/554; 156/577; 156/579
[58] Field of Search .......... 156/523, 527, 577, 579, 156/554

[56] References Cited

U.S. PATENT DOCUMENTS 2,522,773 9/1950 Bihary .......... 156/554
3,787,271 1/1974 Wahlquist .......... 156/554
4,054,482 10/1977 Wahlquist .......... 156/554
4,379,019 4/1983 Poul .......... 156/554
4,508,587 4/1985 Hunter .......... 156/554

*Primary Examiner*—Michael G. Wityshyn
*Attorney, Agent, or Firm*—Donald M. Sell; Walter N. Kirn; William L. Huebsch

[57] ABSTRACT

A portable device for guiding a length of pressure sensitive adhesive coated tape partially onto the outer wrap of a roll of masking material adjacent one of its edges to provide a composite masking sheet for use in masking surfaces comprising a length of the sheet material having the tape adhered along and extending widthwise past one edge by which the composite masking sheet can be adhered to a surface. The outer edge of the tape is not guided by the device, and a tendency that otherwise exists for the tape being adhered along the edge portion of the roll of masking material to move transversely away from the masking material so that less and less of the tape is adhered to the masking material is restricted by a tracking member mounted on a frame of the device between a hub supporting a roll of the tape and the roll of masking material. The tracking member engages the rear surface of the tape along its edge that overlaps the masking material for less than the full width of the tape and deflects the tape toward a plane through the axes of the rolls of tape and masking material from a plane which is mutually tangent to the peripheries of the rolls of tape and masking material.

2 Claims, 1 Drawing Sheet

MASKING DEVICE WITH TAPE TRACKING MEMBER

CROSS REFERENCE TO RELATED APPLICATIONS

This application is a continuation in part of U.S. patent application Ser. No. 326,015 filed March 20, 1989, U.S. Pat. No. 4,915,769, the content whereof is incorporated herein by reference.

TECHNICAL FIELD

The present invention relates to portable devices for merging sheet masking material and pressure sensitive adhesive coated tape dispensed from the device to provide a composite masking sheet for use in masking surfaces such as during painting, which composite masking sheet comprises a length of the sheet material having the tape adhered along and extending widthwise past one edge by which the composite masking sheet can be adhered to a surface to be masked.

BACKGROUND ART

The prior art is replete with portable devices of the type described above that merge pressure sensitive adhesive coated tape with sheet masking material supplied from rolls of the tape and masking material carried on the devices. U.S. Pat. Nos. 3,787,271; 4,379,019; 4,425,182; and 4,508,587 provide illustrative examples.

The portable device of this type described in U.S Pat. No. 4,379,019 comprises a frame including a hub support portion and a handle adapted for manual engagement to manipulate the device, and first and second hubs mounted on said frame for rotation about spaced generally parallel axes. The first hub includes means for receiving the roll of tape and positioning a first edge of the length of tape at a first predetermined position axially with respect to the first and second hubs with the second edge of the length of tape projecting past the frame, and the second hub is adapted to receive the roll of masking material and position a first edge of the length of masking material at a second predetermined position axially with respect to said first and second hubs with the width of the length of tape extending from the first position past the second position and the width of the length of masking material extending from the second position past the first position so that a portion of the length of tape along the first edge of the length of tape and a portion of the length of masking material along the first edge of the length of masking material are both positioned between those first and second positions. The device also includes path defining means defining a path for the length of tape from the roll of tape along which path the second edge of the tape is not guided, and a path for the length of masking material from the roll of masking material. The paths defined by the path defining means include a tape path portion for the tape from the roll of tape to the periphery of the roll of masking material and a common path portion beginning at the periphery of the roll of masking material where the portion of tape along the first edge of the length of tape is adhered to the portion of the masking material along the first edge of the length of masking material to form a composite masking sheet having opposite edges defined by the second edges of the length of tape and the length of masking material and an exposed portion of the coating of pressure sensitive adhesive along the second edge on the length of tape along one major surface of the composite masking sheet so that the exposed portion of the coating of adhesive can be adhered along a surface to be masked to hold the composite masking sheet in a desired position.

The tape being adhered along the edge portion of the masking material by such a device has a tendency to move transversely away from the masking material with respect to the first edge of the masking material so that less and less of the tape is adhered to the masking material. Such lateral tracking of the tape has some tendency to occur with the types and widths of tapes (e.g., ¾ inch wide masking tape) and masking materials (e.g., craft paper) most often used on such devices, has even a greater tendency to occur when wider widths of tape or tapes with more aggressive adhesive (e.g., duct tapes) are applied to the masking material (e.g., tape having a width of two inches can track laterally sufficiently to separate from the first edge of the masking material), and is particularly pronounced when tape is applied to the soft edge portion of a roll of folded plastic masking material.

DISCLOSURE OF THE INVENTION

The present invention provides a simple and inexpensive improvement in a device of the type described above that restricts such lateral tracking of the tape with respect to the first edge of the masking material.

The present invention provides an improvement in the device described above with reference to U.S. Pat. No. 4,379,019 in that the path defining means includes a tracking member mounted on the frame at a position between the first and second hubs and having a tracking surface adapted to engage the rear surface of the tape along the portion of the length of tape along its first edge to deflect the tape toward the axes of the hubs from a plane which is mutually tangent to the peripheries of the roll of tape and the roll of masking material. The tracking surface of the tracking member has a length parallel to the axes of the hubs that is significantly less than the width of the tape. Such a tracking member has been found to both (1) insure that the tape will stay in alignment with the edge of the masking material as it is applied to the masking material on the roll, even when the tape being applied is very wide or has a very aggressive adhesive, or when the roll of masking material has a soft edge as is typically the case when the masking material is a polymeric film, and (2) does not interfere with use of the device to apply the tape projecting past the masking material along one surface (such as the surface of a wall) at its intersection with another surface (such as the surface of a ceiling) since the tracking member does not project across the entire width of the tape.

BRIEF DESCRIPTION OF DRAWING

The present invention will be further described with reference to the accompanying drawing wherein like reference numerals refer to like parts in the several views, and wherein.

DETAILED DESCRIPTION

Figures 1, 2:
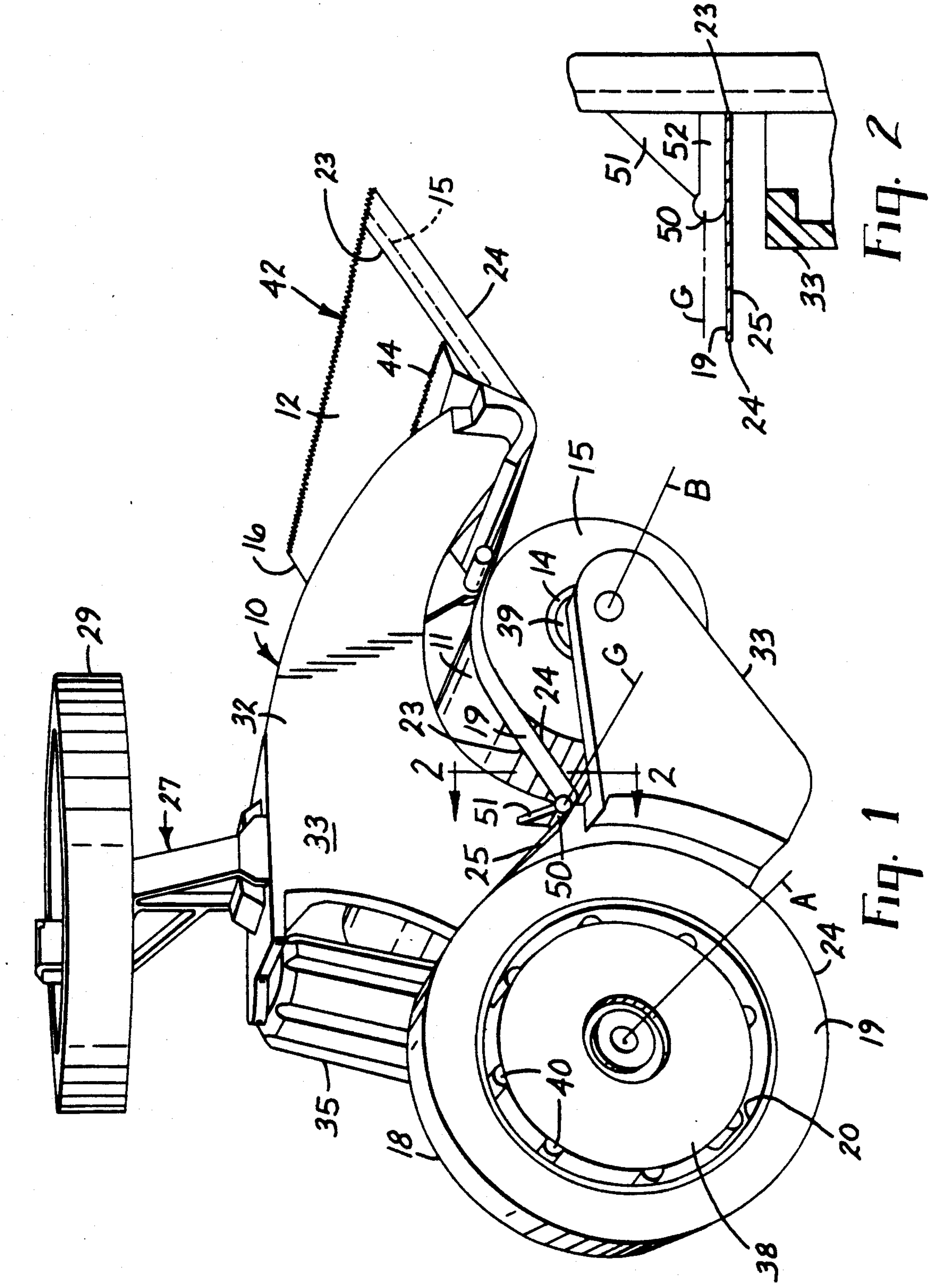
FIG. 1 is a perspective view of a portable device for merging sheet masking material and pressure sensitive adhesive coated tape dispensed from the device including the improvement according to the present invention.
FIG. 2 is an enlarged fragmentary sectional view taken approximately along the line 2—2 of FIG. 1.

Referring now to the drawing there is illustrated a device 10 according to the present invention for use with a roll 11 of masking material 12 comprising a length of the masking material 12 helically wound around a core 14 and having opposite major surfaces, and first and second elongate edges 15 and 16; and with a roll 18 of tape 19 comprising a length of the tape 19 wound around a core 20 and comprising a backing having front and rear surfaces and first and second elongate edges 23 and 24, and a coating 25 of pressure sensitive adhesive on the front surface. The device 10 is essentially the same as the device described in U.S. Pat. No. 4,379,019 (the content whereof is incorporated herein by reference) except for (1) the improvement according to the present invention described below, and (2) a manually releasable mechanism for removably attaching an assembly 27 on a frame 32 of the device 10 that carries an extra roll 29 of tape from which tape can be withdrawn as needed during a masking operation that is described in greater detail and claimed in U.S. patent application Ser. No. 326,015 filed March 20, 1989, of which this application is a continuation in part.

Generally, the device 10 comprises the frame 32 that includes a hub support portion 33 having opposite sides and includes a handle 35 adapted for manual engagement to manipulate the device 10. First and second hubs 38 and 39 are mounted on the hub support portion 33 of the frame 32 for rotation about spaced generally parallel axes indicated by lines A and B respectively. The first hub 38 includes a periphery defined by axially extending ribs 40 that provides means for frictionally receiving the inner surface of the core 20 of the roll 18 of tape 19 and flanges (not seen) at the ends of the ribs 40 adjacent the frame 32 for positioning the first edge 23 of the length of tape 19 at a first predetermined position axially with respect to the first and second hubs 38 and 39 with the second edge 24 of the length of tape 19 projecting past the frame 32. The second hub 39 is adapted to receive the core 14 of the roll 11 of masking material 12 and position the first edge 15 of the length of masking material 12 at a second predetermined position axially with respect to the first and second hubs 38 and 39 with the width of the length of tape 19 extending from the first position past the second position and the width of the length of masking material 12 extending from the second position past the first position. Thus portions along the first edges 15 and 23 of the lengths of tape and masking material 19 and 12 are both positioned between the first and second positions. Path defining means are provided by the hubs 38 and 39 and frame 32 for defining a path for the length of tape 19 from the tape supply roll 18 along which path the second edge 24 of the tape 19 (which projects past the edge of the frame 32) is not guided and a path for the length of masking material 12 from the roll 11 of masking material 12. Those paths include a tape path portion for the tape 19 from the roll 18 of tape 19 to the periphery of the roll 11 of masking material 12, and a common path portion beginning at the periphery of the roll 11 of masking material 12 where the portion of the length of tape 19 along its first edge 23 is adhered to the portion of masking material 12 along its first edge 15 to form a composite masking sheet 42. The composite masking sheet 42 has opposite edges defined by the second edges 24 and 16 of the length of tape 19 and the length of masking material 12, and an exposed portion of the layer 25 of adhesive along the second edge 24 on the length of tape (i.e., between the second edge 24 of the length of tape 19 and the first edge 15 of the masking material 12) extending along one major surface of the composite masking sheet 12. The exposed portion of the layer 25 of adhesive along the composite masking sheet 42 can be adhered along a surface to be masked to attach the composite masking sheet 12 thereto.

The device further includes a cutting blade 44 having a serrated edge and mounted on the frame 32 transverse of the common path portion and positioned to afford engagement of the serrated edge of the blade 44 to sever the composite masking sheet 42.

The improvement in the device 10 according to the present invention comprises the path defining means including a tracking member 50 mounted on the hub support portion 33 of the frame 32 at one end and by a gusset 51 in a position between the first and second hubs 38 and 39. The tracking member 50 has a tracking surface 52 that is arcuate about an axis indicated by a line G that is parallel to the axes A and B and has an axial length (i.e., in a direction parallel to its axis G and to the axes A and B of the hubs 38 and 39) which is less than the width of the tape between its first and second edges 23 and 24. The tracking surface 52 is positioned and adapted to engage the rear surface of the tape 19 along the portion thereof adjacent its first edge 23 to deflect the tape 12 toward a plane through the axes A and B of the hubs 38 and 39 from a plane which is mutually tangent to the peripheries of the roll 18 of tape 19 and the roll 11 of masking material 12.

It has been found that to be effective in directing the tape 19 along a straight course or path from the roll 18 of tape 19 to the roll 11 of masking material 12 (i.e., with the edges 23 and 24 of the tape between the rolls 18 and 11 parallel with the edges 23 and 24 of the tape 19 on the roll 18 of tape 19), the tracking surface 52 of the tracking member 50 need only engage the rear surface of the tape 19 along a very narrow portion adjacent its first edge 23, such as a portion 0.64 centimeter ($\frac{1}{4}$ inch) wide or less for tapes up to 5 centimeters (2 inches) in width. It is preferred, however, that the tracking member 50 have an axial tracking surface 52 length of about 1.3 centimeters ($\frac{1}{2}$ inch) for use with tapes 19 from 1.9 centimeters ($\frac{3}{4}$ inch) width up to 5 centimeters (2 inches) width so that the rear surface of the tape 19 will be retained beneath the tracking member 50 when the device 10 is handled between uses, and the tracking member 50 will still not project far enough to engage a surface disposed at a right angle to the major surfaces of the composite masking sheet 42 along which the edge of the composite masking sheet 42 defined by the outer edge 24 of the tape 19 is being applied (e.g., the tracking member 50 will still not project far enough to engage a ceiling surface when the composite masking sheet 42 is being applied to a wall intersecting the ceiling surface with the edge of the composite masking sheet 42 defined by the outer edge 24 of the tape 19 along the intersection between the wall and the ceiling surface). Such a tracking member 50 having an axial tracking surface 52 length of approximately 1.3 centimeters ($\frac{1}{2}$ inch) has been found sufficient for properly guiding conventional masking tape 19 having a width of up to 5 centimeters (2 inches), for guiding tape 19 with very aggressive adhesive such as the type commonly referred to as duct tape, and for guiding tape 19 onto rolls 11 of masking material 12 having a soft or yielding edge portion and a smooth slick surface, such as rolls 11 of folded plastic film.

The present invention has now been described with reference to one embodiment thereof. It will be apparent to those skilled in the art that changes can be made in the embodiment described without departing from the scope of the present invention, and that a tracking member of the type described herein can be used with each of two rolls of tape on a device that applies tape along both opposite edge surface portions of masking material. The tape tracking member illustrated as a cylindrical pin may assume other forms having a surface or surfaces parallel to the axes of the hubs. Thus the scope of the present invention should not be limited to the structure described in this application, but only by structures described by the language of the claims and the equivalents of those structures.

We claim:

1. A portable device for use with a roll of masking material comprising a length of masking material helically wound around a core and having opposite major surfaces and opposite first and second elongate edges, and a roll of tape comprising a length of tape helically wound around a core and comprising a backing having front and rear surfaces and opposite first and second elongate edges and a coating of pressure sensitive adhesive on said front surface, said portable device comprising:

a frame including a hub support portion having opposite sides and including a handle adapted for manual engagement to manipulate said device;

first and second hubs mounted on said hub support portion of said frame for rotation about spaced generally parallel axes, said first hub including means for receiving the core of said roll of tape and for positioning the first edge of the length of tape at a first predetermined position axially with respect to said first and second hubs with the second edge of the length of tape projecting past the frame, and said second hub being adapted to receive the core of said roll of masking material and position the first edge of the length of masking material at a second predetermined position axially with respect to said first and second hubs with the width of said length of tape extending from the first position past the second position and the width of the masking material extending from the second position past the first position so that a portion of the length of tape along the first edge of the length of tape and a portion of the length of masking material along the first edge of the length of masking material are both positioned between said first and second positions; and path defining means defining a path for said length of tape from said roll of tape along which path the second edge of the tape is unguided and a path for said length of masking material from said roll of masking material, said paths including a tape path portion for said tape from said roll of tape to the periphery of said roll of masking material and a common path portion beginning at the periphery of said roll of masking material where said portion of the length of tape along the first edge of the length of tape is adhered to said portion of the length of masking material along the first edge of the length of masking material to form a composite masking sheet having opposite edges defined by the second edges of the length of tape and the length of masking material and an exposed portion of the coating of pressure sensitive adhesive along the second edge of the length of tape along one major surface of the composite masking sheet so that the exposed portion of the coating of pressure sensitive adhesive can be adhered along a surface to be masked to attach the composite masking sheet thereto; said path defining means including a tracking member fixed to said frame at a position between said first and second hubs and having a tracking surface that has a length in a direction parallel to the axes of said hubs which is significantly less than the width of said tape between said first and second edges, said tracking surface being positioned and adapted to engage said tape along said tape path portion only at a position spaced from the periphery of the roll of masking material and to engage the rear surface of the tape along said portion of the length of tape along the first edge of the length of tape to deflect the tape along the tape path portion toward a plane through the axes of said hubs from a plane which is mutually tangent to the peripheries of said roll of tape and said roll of masking material.

2. A device according to claim 1 further including a cutting blade mounted on said frame transverse of said common path portion and positioned to afford engagement between said blade and the composite masking sheet.

* * * * *